United States Patent Office 3,512,149
Patented May 12, 1970

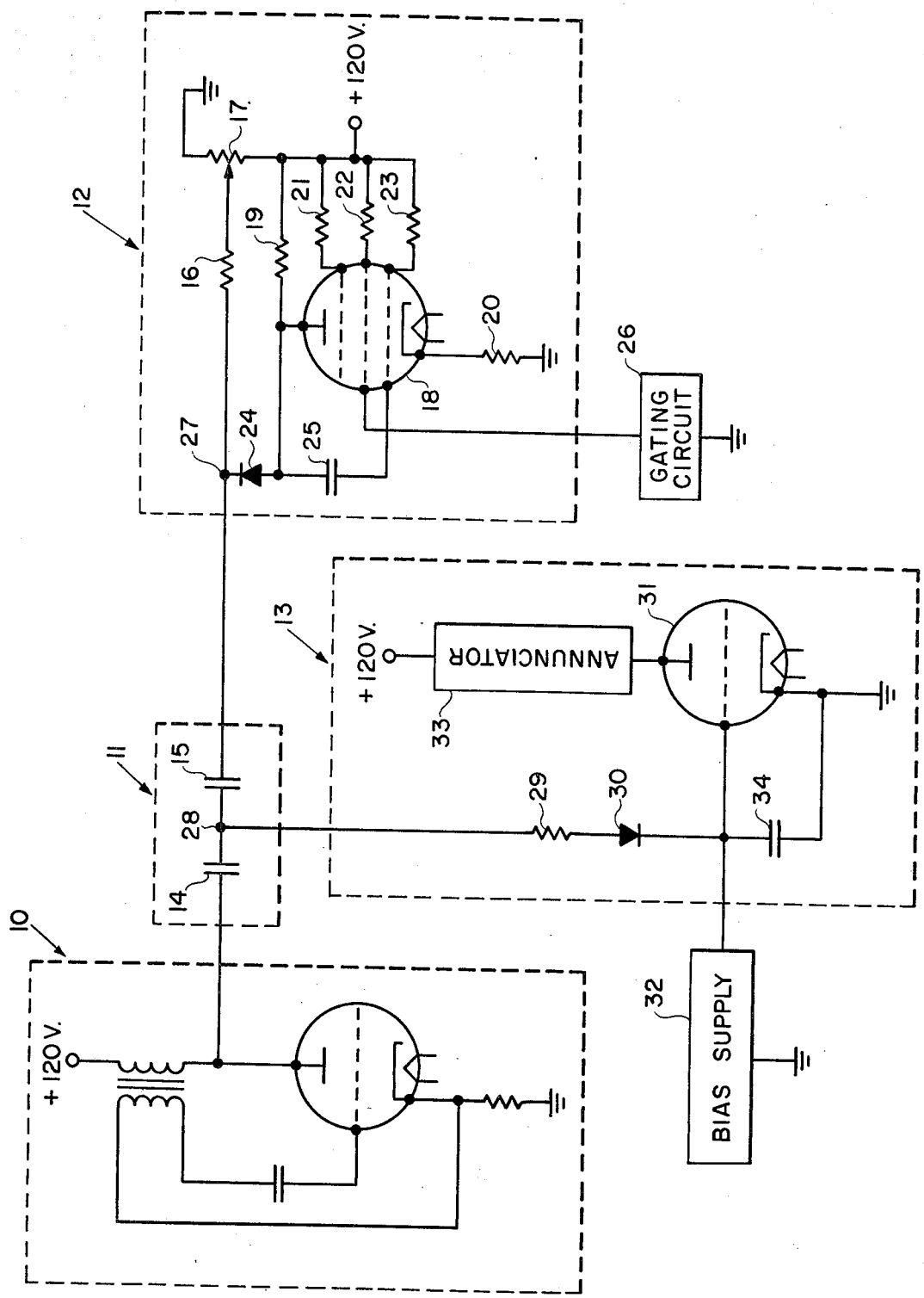

3,512,149
DIRECT CURRENT LEAKAGE SENSING CIRCUIT
John E. Pugh, Belleville, Ontario, Canada, assignor to Northern Electric Company Limited, Montreal, Quebec, Canada
Filed May 24, 1968, Ser. No. 731,813
Int. Cl. G08b 21/00; H02h 1/00
U.S. Cl. 340—253                                    3 Claims

ABSTRACT OF THE DISCLOSURE

A direct current detector connected to a junction point between two serially connected capacitors each of which is electrically stressed by an applied direct current voltage. When perfect, each capacitor inhibits direct current flow thereby producing a zero direct current voltage at the junction point. When either or both capacitors develop leakage resistance, the applied direct current voltage is conducted to the junction point and may be detected to indicate the leakage fault.

---

This invention relates to alternating current signal coupling circuits exhibiting a high degree of reliability, and in particular to monitoring circuits which indicate the relative degree of such reliability.

Simple resistance-capacitance signal coupling circuits are well known in the art. Their widespread use is seen particularly in the field of communications in those instances where it is required to inhibit direct current flow between a source circuit and a load circuit but to pass an alternating current therebetween. In many applications it has been found that the conventional form of a resistance-capacitance coupling circuit is adequate. The circuit structure referred to is the simple one wherein an electrical capacitor is serially connected between a signal source circuit and a load circuit. In the majority of commercial applications where this circuit is used, failure of the coupling capacitor usually results in failure of operation of the complete system, of which the coupling circuit forms only a part, and perhaps destruction, by direct current flow, of some associated components. It would seem that largely for economic reasons such disadvantages can be tolerated, for it is seldom that an appliance breakdown in a domestic environmental setting occasions a crisis. And, it is likely felt by many appliance manufacturers that most domestic users would tolerate such occasional inconveniences in exchange for a lower purchase cost rather than have highly reliable equipment at an appreciably higher purchase cost. However, there do remain many areas within the communications art where a coupling capacitor failure would be intolerable. Many instances could be cited wherein such a simple component failure could lead to damage or destruction of expensive associated components, and, in the extreme case, of possible loss of life and loss of expensive equipment. For example, if such a failure took place within a radar navigational system aboard a ship or an aircraft during adverse weather conditions, there would then exist a distinct possibility of a collision with other such vehicles or with navigational hazards. This is particularly true of aircraft in view of their high travel speeds.

One method used to reduce leakage failures in coupling capacitors, which is well known and is often used by those skilled in the art, is to use capacitors having high voltage ratings. In many applications, particularly in circuits where low operating voltages are used, this method performs reasonably well. But, particularly in circuits where operating voltages are higher, and this is often the case, the problem of coupling capacitor leakage remains since no matter how high an operating voltage rating is chosen, a capacitor leakage probability factor continues to exist even though in diminished form. This is especially true in the case of aircraft radio equipment where large changes in air pressure, temperature and humidity are conductive to the condensation of moisture which may be introduced into the component by the pressure changes. An attendant problem that further confronts a circuit designer when a decision is made to use a high voltage rating capacitor is that of physical size. Usually, a high operating voltage rating means a capacitor of larger physical size. This could be an important consideration, particularly in compact airborne equipment where there may be room for two relatively small components but insufficient space for a single large component.

An alternate method, also well known in the art, has been devised to minimize the coupling capacitor leakage problem. In circuits requiring a high degree of reliability, where leakage or short circuiting of a capacitor may cause damage to other components, or produce faulty operation of the overall circuit, it is common practice to use a second coupling capacitor in series with the first coupling capacitor. The electrical capacitance values of both capacitors taken together would be equal to that of a single capacitor used in the circuit. The theoretical advantage of this method is, of course, that the probability of two capacitors failing simultaneously is considerably less than that of one capacitor failing in any given time period. The disadvantage of this method, however, is that it provides no indication of the failure of one component. And, if such a failure does occur, the circuit then reverts to the condition of one coupling capacitor with its minimum valued reliability factor. As the operation of the overall circuit would likely continue unaltered, the reliability of the coupling circuit would have to be tested during regular maintenance periods; a repairman would break the circuit and check each capacitor separately for an absolute test. This can easily be over-looked due to lack of time or possibly interest. Furthermore, routine testing of the coupling capacitors involves unsoldering and resoldering interconnecting leads, in the process of which heat could crack a seal thereby initiating a deterioration process which did not exist before the test.

In a particular example of an aircraft radio distance measuring equipment, an electrical coupling capacitor is used to pass negative pulses to a phantastron electron tube circuit while isolating a first direct current voltage from the phantastron electron tube plate. Thus, this first direct current voltage is applied to one side of the coupling capacitor. A second source of direct current voltage, which is variable and which changes the length of the phantastron circuit output pulse, is connected to the other side of the coupling capacitor. Direct current leakage through the capacitor will change the length of the output pulse but will not have any effect on the accuracy of the readings obtainable from the equipment until sufficient leakage exists to change the range readings by a discrete amount; in this example it is 20 miles. This may occur as a quantum error jump without knowledge of the user of the equipment unless independent cross-checking of the range is done with ancillary equipment. The pilot of a high speed aircraft approaching an airfield may not have sufficient time to perform such cross-checks. The coupling circuit is of such configuration that resistance measurements across the capacitor give indeterminate results and maintenance personnel are not likely to open the coupling circuit to make extensive tests unless the error is already noted. The quantum error jump can easily occur even during the duration of one flight in which the equipment operates correctly at take off but malfunctions before landing. Personnel, and aircraft safety is thus at stake.

An object of the invention, therefore, is to provide a means whereby users of, and maintenance personnel for radio distance measuring equipment can detect incipient deterioration in particular coupling capacitors before false readings are given by the equipment.

The invention disclosed herein is an improvement to an electrical signal coupling circuit which comprises two capacitors serially connected between input and output terminals and which are used to couple an alternating signal voltage therebetween while inhibiting the passage of direct current; the improvement comprising a high impedance direct current detection means connected between the junction of the two capacitors, the detection means being responsive to a leakage fault in either one or both capacitors whereby the leakage fault will be detected and a relative indication of circuit reliability given without affecting either the operation or accuracy of the radio equipment.

In the same example of an aircraft radio distance measuring equipment as hereinabove stated, a second capacitor was added in series with a first capacitor to obtain a signal coupling circuit having a maximum reliability factor. The use of two coupling capacitors in a series connection would indicate, of course, cognizance of the problem as discussed, and it may be reasonably expected that the full limit of knowledge common to the art was employed to attain a solution.

The two capacitors couple pulses between a blocking oscillator and a phantastron circuit in an aircraft's radio distance measuring equipment. It was recognized that with two perfect capacitors no direct current voltage would exist at their junction point. However, if deterioration in insulation resistance did occur in one or both capacitors, a direct current voltage at the junction of the two capacitors would be present. This voltage could then be fed to an alarm circuit comprising an electron tube which could operate an annunciator on an instrument panel. The sensitivity of the alarm circuit was designed so that it would operate before coupling capacitor deterioration had progressed sufficiently to produce erroneous distance readings. In this way, automatic monitoring of the deterioration of either capacitor could be made. The maximum reliability of the coupling circuit would be maintained by positively identifying a defective capacitor condition and replacing the defective capacitor before further deterioration could affect the operation of the system.

An example embodiment of the invention will now be described with reference to the accompanying drawing which illustrates a schematic circuit diagram of part of a radio distance measuring equipment.

Reference to the drawing shows a blocking oscillator circuit 10 having an output connection coupled through a high reliability capacitive coupling network 11 to a phantastron circuit 12. A connection is also shown from the capacitive coupling network 11 to an alarm circuit 13. Thus, a 60 volt peak to peak negative going pulse which is generated by the blocking oscillator 10 is coupled through a capacitor 14, and a capacitor 15 of the capacitive coupling network 11 to the phantastron circuit 12. Reference to the drawing shows that the capacitor 14 has a direct current voltage of about +120 volts applied to its one side, the side connected to the plate circuit in the blocking oscillator circuit 10; the other end of the plate circuit in turn being connected to a +120 volt operating voltage source. The capacitor 15, which makes connection with the phantastron circuit 12, is connected to a resistor 16 which in turn is connected to a positive direct current voltage source through the adjustable arm of a potentiometer 17, the position of the arm being proportional to the measured range. Depending on the position of the adjustable arm, the direct current voltage applied to the one side of the capacitor 15 can vary from between about +40 volts and +120 volts. The adjustable arm of the potentiometer 17 is mechanically coupled to range measuring dials, located elsewhere in the radio distance measuring system, of which the circuits in the drawing form only a part thereof.

A positive operating volatge at the plate of a phantastron tube 18 is obtained by connection through a resistor 19 to the +120 volt operating voltage source. The cathode is connected to chassis ground through a resistor 20 to complete the tube circuit while the remaining elements of the phantastron tube 18 obtain their required operating voltages from the +120 volt operating voltage source through their respective voltage dropping resistors 21, 22 and 23.

The negative going 60 volt peak to peak pulse is further coupled through a diode 24 to the plate of the phantastron tube 18 and through a capacitor 25 to the control grid element of the tube. An output pulse which is proportional to the direct current voltage appearing on the plate of the phantastron tube 18 is generated by the tube and is applied to a gating circuit 26 which is shown in block form.

Leakage of direct current through the two capacitors 14 and 15 will change the magnitude of the direct current voltage at a junction point 27 and will cause the phantastron tube 18 to produce an output pulse having a length that is not proportional to the true range as represented by the voltage at the adjustable arm of the potentiometer 17. However, if the leakage current is sufficiently small, less than $4 \times 10^{-7}$ amperes, the error in the pulse length will also be small, and the accuracy of the ranging system will not be affected. Under these conditions it is unnecessary to detect the deterioration of the insulation resistances of the capacitors 14 and 15. However, the system would then be in a condition where further leakage in the capacitors 14 and 15 is likely, and if increased the accuracy of the radio distance measuring equipment will suffer. Accordingly, if the leakage current exceeds $4 \times 10^{-7}$ amperes an indication will be given by the alarm circuit 13.

The phantastron tube 18 output pulse is fed to the gating circuit 26 in coincidence with a series of marking pulses each representing 20 miles increment in range. The gating circuit 26 operates whenever a marking pulse sits on the phantastron pulse, and thence drives a ranging circuit connected through suitable motors, gears, resolvers and dials to control the position of the marking pulses.

Due to the presence of a sufficiently large incorrect direct current potential at the junction joint 27, brought about by excessive direct current leakage through both the capacitors 14 and 15, the length of the phantastron tube 18 output pulse to the gating circuit 26 will have a large error. This will result in an unwanted marking pulse to be in coincidence with the phantastron tube 18 output pulse thereby introducing a large range error in the system.

In the event that a direct current leakage should occur only in capacitor 14 or in capacitor 15, a positive direct current voltage will be produced at a junction point 28. But, no change in voltage will occur at the junction point 27. Thus, the phantastron circuit 12 will continue to function normally but in a reduced reliability mode since only one of the capacitors 14 or 15 effectively remains in the circuit to block the passage of direct current flow between the blocking oscillator circuit 10 and the phantastron circuit 12. The positive voltage at the junction point 28 is then applied through an isolating resistor 29, and through a diode 30 onto a control electrode shown as a control grid element of a normally cutoff amplifying device shown as a triode tube 31 in the alarm circuit 13. The resultant flow of positive direct current overcomes a collector-current inhibiting negative cutoff bias from a high impedance direct current voltage bias source 32 thereby causing the triode tube 31 to conduct current. This will energize the field coil of an electromechanical device shown as an annunciator 33 connected between the collector, shown as the plate of the triode tube 31, and the +120 volt operating voltage source. In this circuit configuration, the emitter, shown as the cathode of the triode tube 31, is connected directly to ground. However, the circuit will function as well if the field coil is connected between the cathode and ground, and the plate is connected directly to the +120 volt operating voltage source.

The resistor 29 is used to isolate the alarm circuit 13 from the phantastron circuit 12. The diode 30 acts to isolate the 60 volt peak to peak negative going pulses, appearing at the junction point 28, from the control grid element of the triode tube 31 to prevent erratic operation of the alarm circuit 13. A capacitor 34 is used to bypass to ground any positive going noise voltage spikes which may appear on the control grid element of the triode tube 31, thereby reducing the probability of false alarms.

The combination of the coupling capacitors 14 and 15, connected in series, results in a zero direct current voltage at the junction point 28. It is apparent from the circuit operation described that in the event that either of the coupling capacitors 14 and 15 should become leaky, the positive direct current voltage which will appear at the terminal point 28 will trip the alarm circuit 13 to indicate a component failure and also to indicate a reduction in the reliability factor of the radio distance measuring system.

The preceding description is that of a direct current leakage sensing circuit which may be used advantageously to detect leakage current in an electrical signal coupling circuit comprising two series connected electrical coupling capacitors whereby the relative quality of the coupling circuit may be readily ascertained.

What is claimed is:

1. In an electrical circuit comprising: an input terminal, an output terminal, a common terminal, two capacitors serially connected between the input and output terminals, an input signal voltage source connected between the input and common terminals and having a first direct current voltage thereacross, and a load circuit connected between the output and common terminals and having a second direct current voltage thereacross, an improvement therein comprising:

a high impedance direct current detection means connected between the junction of the said capacitors and the common terminal so that a leakage fault in one of the said capacitors results in a flow of direct current from the respective voltage source through the faulty capacitor and the detection means, whereby the leakage fault is detected.

2. An improvement as defined in claim 1 wherein the said detector means is responsive to a direct current flow having a minimum value of about $4.0 \times 10^{-7}$ amperes so as to indicate the said leakage fault.

3. An improvement as defined in claim 2 wherein the detection means comprises an amplifying device having collector, emitter and control electrodes; a source of operating voltage to induce current flow between the collector and the emitter electrodes; a high impedance direct current voltage bias source connected between the control and emitter electrodes to inhibit current flow between the collector and the emitter electrodes; a bypass capacitor connected between the emitter and the control electrodes; a resistor and a diode serially connected between the junction of the said capacitors and the control electrode to provide a conductive path for the said flow of direct current; and an electromagnetic device having a field coil which is connected in series with the collector and the emitter electrodes across the source of operating voltage whereby an indication is given on the occurrence of emitter to collector current flow which is initiated when the inhibiting effect of the control electrode is overcome by the said flow of direct current through the faulty capacitor.

References Cited

UNITED STATES PATENTS 2,271,292    1/1942    Fisher.
3,255,409    6/1966    Sztybel.

LEE T. HIX, Primary Examiner

H. FENDELMAN, Assistant Examiner

U.S. Cl. X.R.

317—9, 12, 51; 324—60